United States Patent [19]
Okumura et al.

[11] Patent Number: 5,746,581
[45] Date of Patent: May 5, 1998

[54] METHOD AND APPARATUS FOR EVACUATING VACUUM SYSTEM

[75] Inventors: Katsuya Okumura, Pouhkeepsie, N.Y.; Yuuichi Mikata; Manabu Tsujimura, both of Kanagawa-ken, Japan; Yoshio Ando, Kanagawa-ken, Japan

[73] Assignees: Ebara Corporation, Tokyo; Kabushiki Kaisha Toshiba, Kawasaki-shi, both of Japan

[21] Appl. No.: 468,325

[22] Filed: Jun. 6, 1995

[30] Foreign Application Priority Data

Jun. 28, 1994 [JP] Japan ................. 6-170301
May 23, 1995 [JP] Japan ................. 7-149503

[51] Int. Cl.$^6$ ............... F04B 41/06; F04B 49/00
[52] U.S. Cl. ............... 417/2; 417/42; 417/43; 417/44.2; 417/53
[58] Field of Search ............... 417/2, 42, 43, 417/44.1, 44.2, 44.11, 45, 53, 62, 85, 286, 426

[56] References Cited

U.S. PATENT DOCUMENTS

| | | | |
|---|---|---|---|
| 4,699,570 | 10/1987 | Bohn | 417/6 |
| 4,770,609 | 9/1988 | Uchida et al. | 417/2 |
| 4,797,068 | 1/1989 | Hayakawa et al. | 417/201 |
| 4,887,941 | 12/1989 | Cimquette et al. | 417/2 |
| 5,039,280 | 8/1991 | Saulgeot et al. | 417/2 |
| 5,242,539 | 9/1993 | Kumihashi et al. | 156/643 |
| 5,318,667 | 6/1994 | Kumihashi et al. | 156/643 |

FOREIGN PATENT DOCUMENTS

| | | |
|---|---|---|
| 0 585 911 A1 | 3/1994 | European Pat. Off. |
| 3828608 A1 | 3/1990 | Germany |
| 62-224685 | 10/1987 | Japan |
| 5-231381 | 9/1993 | Japan |

Primary Examiner—Timothy Thorpe
Assistant Examiner—Peter G. Korytnyk
Attorney, Agent, or Firm—Oblon, Spivak, McClelland, Maier & Neustadt, P.C.

[57] ABSTRACT

A method and apparatus for evacuating a vacuum system which includes an evacuating portion comprising first and second vacuum pumps which are connected in series. The method and the apparatus are characterized in that the first vacuum pump is operated in a range from reverse rotation to forward rotation, and the second vacuum pump is rotated unidirectionally, thereby enabling pressure control of the vacuum system over a wide range.

18 Claims, 8 Drawing Sheets

METHOD AND APPARATUS FOR EVACUATING VACUUM SYSTEM

BACKGROUND OF THE INVENTION

1. Field of the Art

The present invention relates to a method and apparatus for evacuating a vacuum system having two or more vacuum pumps which are connected in series.

2. Prior Art

Vacuum systems including a vacuum pump or pumps are widely used in various field of art including semiconductor manufacturing processes or the like.

FIG. 7 shows an arrangement of a conventional vacuum system. As illustrated in the figure, the conventional vacuum system has an arrangement in which a throttle valve 12 and a vacuum pump 13 forming an evacuating portion are connected in series to a reaction apparatus 11. Such a vacuum system employs either of the following two pressure control methods.

In one pressure control method, the conductance (i.e., the reciprocal of the channel resistance) is controlled by the throttle valve 12, as shown in FIG. 8. In the other pressure control method, the pump rotation speed is controlled, as shown in FIG. 9. In FIGS. 8 and 9, the axis of the abscissa represents pressure (Torr) on a log scale, and the axis of the ordinate represents pumping speed (l/min) on a log scale.

However, the above-described conventional pressure control methods suffer from the following problems when pressure control is carried out over a wide range: FIG. 10 is a graph showing an operating range by the relationship between pumping speed S and pressure P (Torr). Let us consider a case where it is desired to effect pressure control in the range of from point P1 at which the pumping speed S=2,000 (l/min), and the pressure P=0.1 (Torr), to point P2 at which the pumping speed S=1 (l/min), and the pressure P=300 (Torr).

In the pressure control method where the conductance (i.e., the reciprocal of the channel resistance) is controlled by the throttle valve 12, the throttle valve 12 must be capable of varying the pumping speed S from 2,000 (l/min) to 1 (l/min). If a throttle valve is selected in conformity with the pumping speed S=2,000 (l/min), the opening of the throttle valve at the pumping speed S=1 (l/min) becomes close to 0, making it difficult to control the system. Thus, it is necessary to employ two different kinds of throttle valves, i.e., a throttle valve 12-1 for the pumping speed S=2,000, and a throttle valve 12-2 for the pumping speed S=1, and an evacuation system, as shown in FIG. 11. Further, since the throttle valve 12-2 for the pumping speed S=1 has a small opening, if the system is employed for a semiconductor process or the like, a reaction product is likely to adhere to the piping system and thereby give rise to problems.

In the pressure control method wherein the pump rotation speed is controlled, it is necessary to vary the rotation speed of the pump so that the pumping speed S varies from 2,000 (l/min) to 1 (l/min). Assuming that the pumping speed S of 2,000 (l/min) is obtained when the rotation speed is 100%, it is necessary in order to obtain S=1 to operate the pump at a rotation speed of 100/2,000=0.05%. It is, however, difficult to control the vacuum pump 13 to operate such a low rotation speed.

In view of the above-described circumstances, an object of the present invention is to provide a method and apparatus for evacuating a vacuum system whereby pressure control can be readily effected over a wide range.

SUMMARY OF THE INVENTION

To solve the above-described problems, according to a first aspect, the present invention provides a method for evacuating a vacuum system having an evacuating portion including first and second vacuum pumps, which are connected in series, wherein the first vacuum pump is operated in the range of from reverse rotation to forward rotation, and the second vacuum pump is unidirectionally rotated, thereby controlling the pressure in the vacuum system.

According to a second aspect, the present invention provides an apparatus for evacuating a vacuum system which includes an evacuating portion comprising first and second vacuum pumps which are connected in series, wherein the apparatus includes a controller for operating the first vacuum pump in a range from reverse rotation to forward rotation, and for rotating the second vacuum pump unidirectionally.

According to a further aspect of the invention, the first vacuum pump is positioned closer to a high vacuum side of the system than the second vacuum pump.

According to another aspect of the invention, operation of the first and the second vacuum pumps is effected by controlling the rotational speed of the pumps.

According to still another aspect of the invention, the first and the second vacuum pumps are operated while supplying a predetermined gas or gases to the vacuum system.

According to a still further aspect of the invention, the rotational speed of the first and/or the second vacuum pump is controlled based on the flow rate of the gas or gases supplied to the vacuum system.

According to a further aspect of the invention, the rotational speed of the first and/or the second vacuum pump is controlled based on a pressure in the vacuum system.

According to a still further aspect of the invention, the first and second vacuum pumps are operated with the rotational speed of the second vacuum pump being kept constant.

With the method and apparatus having the features of the invention stated above, the pressure in the vacuum system is controlled as follows.

FIG. 2 is a graph showing the relationship between pumping speed (l/min) and pressure (Torr) when the above-described evacuating method or apparatus is adopted. In the figure, curve A shows pump characteristics when both the first vacuum pump and the second vacuum pump are forwardly rotated at 60 Hz. Curve B shows pump characteristics when the first vacuum pump is forwardly rotated at 15 Hz, while the second vacuum pump is forwardly rotated at 60 Hz. Curve C shows pump characteristics when the first vacuum pump is reversely rotated at 20 Hz, while the second vacuum pump is forwardly rotated at 60 Hz. Curve D shows pump characteristics when the first vacuum pump is reversely rotated at 20 Hz, while the second vacuum pump is forwardly rotated at 30 Hz.

As will be clear from FIG. 2, it is possible to effect pressure control over a wide range by operating at least one vacuum pump, preferably, a high vacuum-side vacuum pump, in the range of from reverse rotation to forward rotation (e.g., the inverter output frequency range of from −60 Hz to +60 Hz).

The pressure in the vacuum system may also be controlled while supplying a gas or gases into the vacuum system.

The above and other objects, features and advantages of the present invention will become more apparent from the following description when taken in conjunction with the accompanying drawings in which preferred embodiments of the present invention are shown by way of illustrative examples.

PREFERRED EMBODIMENTS OF THE INVENTION

Figure 1:
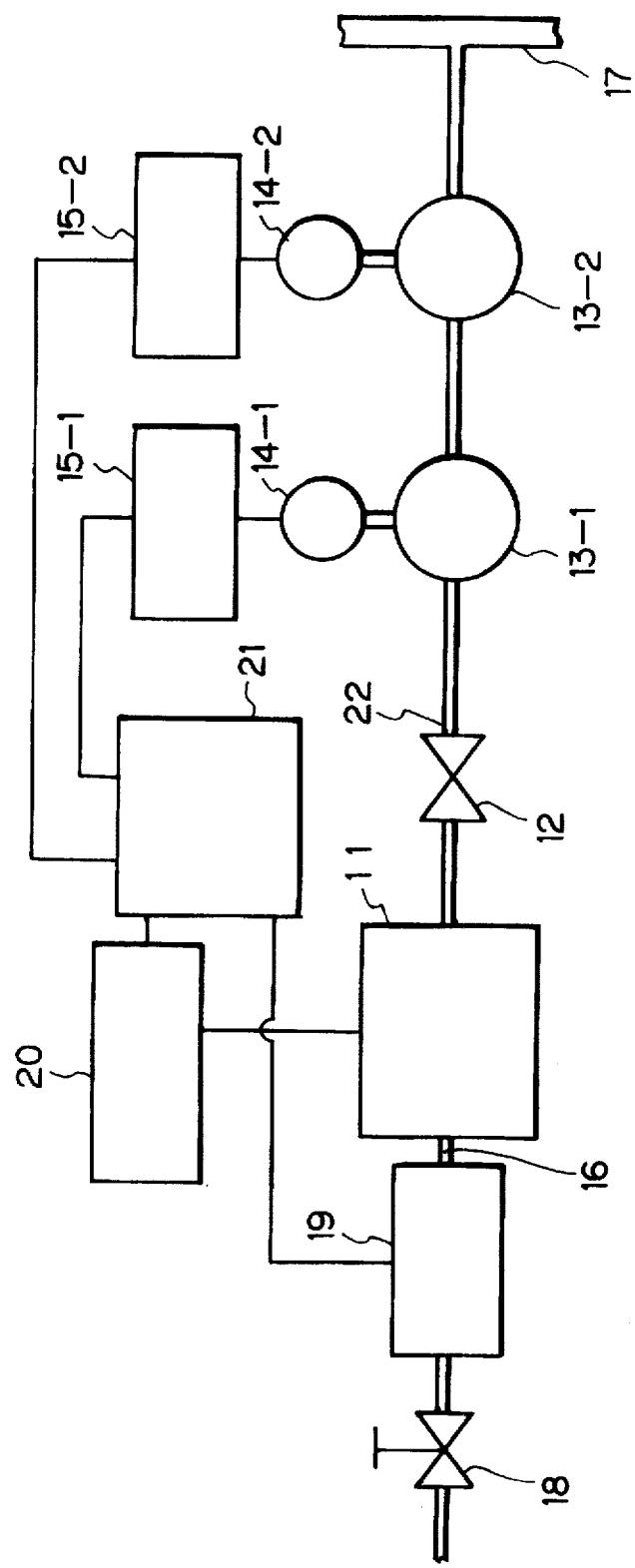
FIG. 1 is a block diagram showing the arrangement of a vacuum system in which the evacuating method of the present invention is carried out.

Preferred embodiments of the present invention will be described below with reference to the accompanying drawings. FIG. 1 is a block diagram showing the arrangement of a vacuum system in which the evacuating method of the present invention is carried out. In FIG. 1, reference numeral 11 denotes a reaction apparatus. To the reaction apparatus 11, a throttle valve 12, a first vacuum pump 13-1, and a second vacuum pump 13-2 are connected in series through a piping 22 in the mentioned order. Reference numeral 14-1 denotes a motor for driving the high vacuum-side vacuum pump 13-1 (closer to the reaction apparatus 11). The operation of the motor 14-1 is controlled by the output of an inverter 15-1. Reference numeral 14-2 denotes a motor for driving the low vacuum-side vacuum pump 13-2. The operation of the motor 14-2 is controlled by the output of an inverter 15-2.

Reference numeral 18 denotes a gas supplying valve connected to a gas inlet 16, 19 a flow meter for detecting a flow rate of a reaction gas supplied from the gas inlet 16 into the reaction apparatus 11, and 20 a pressure gauge for detecting a pressure in the reaction apparatus 11. Outputs from the flow meter 19 and the pressure gauge 20 are input to a controller 21. The controller 21 regulates the rotational speed of the motors 14-1 and 14-2 through the inverters 15-1 and 15-2, respectively, based on the flow rate detected by the flow meter 19 so that pressure detected by the pressure gauge 20 is kept at a predetermined value. It should be noted that reference numeral 17 denotes an exhaust duct.

In the vacuum system arranged as described above, the inverter 15-1 is so arranged that the first vacuum pump 13-1 on the high vacuum-side is operated in the range of from reverse rotation to forward rotation, and the inverter 15-2 is so arranged that the second vacuum pump on the low vacuum-side 13-2 is forwardly rotated with the rotational speed thereof being controlled by the controller 21. By operating the first vacuum pump 13-1 and the second vacuum pump 13-2, a gas is discharged from the reaction apparatus 11 to the exhaust duct 17 through the throttle valve 12, the first vacuum pump 13-1 and the second vacuum pump 13-2. Also, by controlling the opening of the gas supplying valve 18, the flow rate of a gas supplied from a gas supplying source (not shown) into the reaction apparatus 11 may be controlled.

Figure 2:
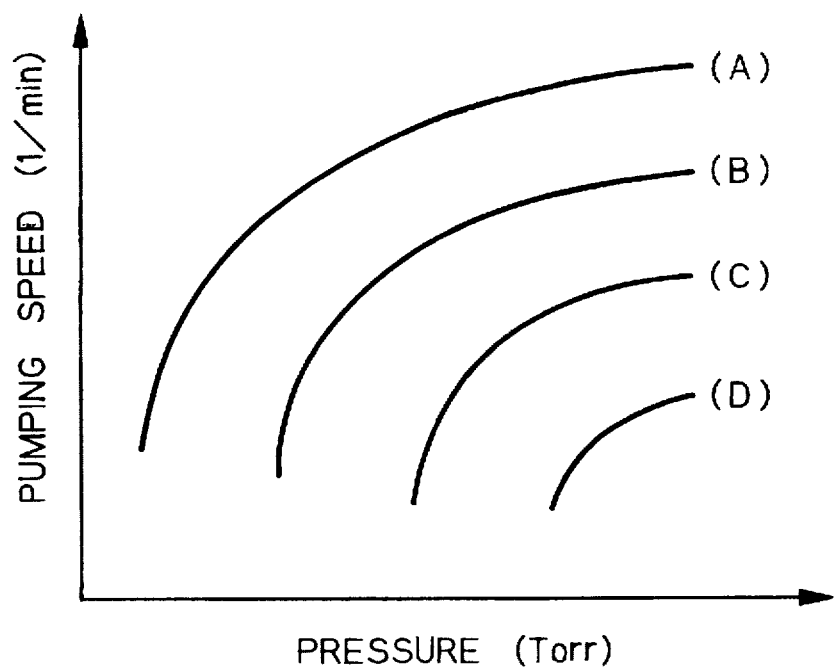
FIG. 2 is a graph showing the relationship between pumping speed and pressure when the operating conditions of a high vacuum-side vacuum pump and low vacuum-side vacuum pump in the vacuum system shown in FIG. 1 are varied.

FIG. 2 is a graph showing the relationship between pumping speed (l/min) and pressure (Torr) when the operating conditions of the first vacuum pump 13-1 on the high vacuum-side and the second vacuum pump 13-2 on the low vacuum side are varied in the vacuum system arranged as shown in FIG. 1. In FIG. 2, curve A shows pump characteristics when both the first vacuum pump 13-1 on the high vacuum-side and the second vacuum pump 13-2 on the low vacuum-side are forwardly rotated at 60 Hz. Curve B shows pump characteristics when the first vacuum pump 13-1 is forwardly rotated at 15 Hz, while the second vacuum pump 13-2 is forwardly rotated at 60 Hz. Curve C shows pump characteristics when the first vacuum pump 13-1 is reversely rotated at 20 Hz, while the second vacuum pump 13-2 is forwardly rotated at 60 Hz. Curve D shows pump characteristics when the first vacuum pump 13-1 is reversely rotated at 20 Hz, while the second vacuum pump 13-2 is forwardly rotated at 30 Hz.

As will be clear from FIG. 2, if the first vacuum pump 13-1 on the high vacuum-side is operated in the range of from forward rotation at 60 Hz to reverse rotation at 60 Hz, while the second vacuum pump 13-2 on the low vacuum-side is forwardly rotated in the range of from 0 to 60 Hz, wide characteristics can be obtained, and the pressure control range widens. Accordingly, if the performance of the second vacuum pump 13-2 on the low vacuum-side is intentionally impaired by reversely rotating the first vacuum pump 13-1 on the high vacuum-side, it becomes possible to effect pressure control over a wide range.

Figure 10:
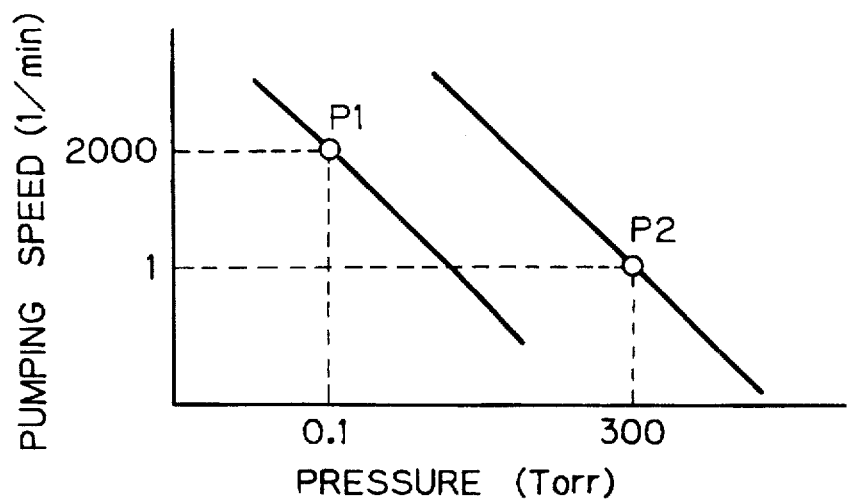
FIG. 10 is a graph showing an operating range by the relationship between pumping speed and pressure.
Figure 11:
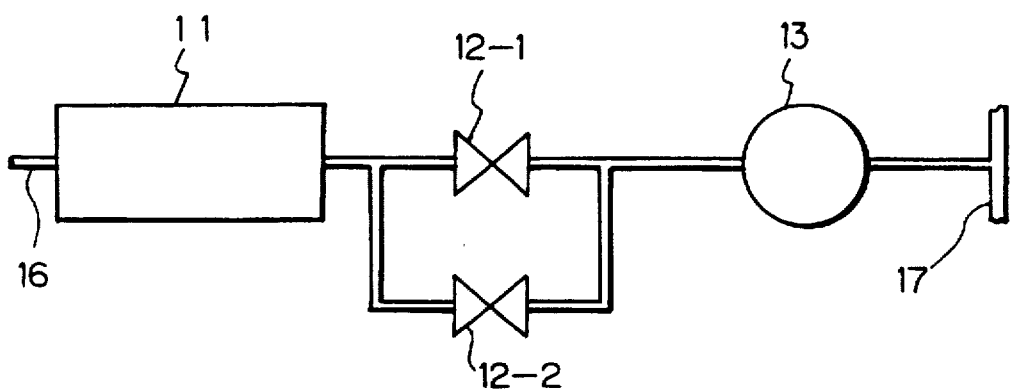
FIG. 11 shows an example of the arrangement of a conventional evacuation system.

In the vacuum system arranged as shown in FIG. 1, it has been experimentally confirmed that the point P1, at which the pumping speed S=2,000 (l/min), and the pressure P=0.1 (Torr), as shown in FIG. 10, for example, can be obtained by setting the forward rotation speed of the first vacuum pump 13-1 at about 66.6%, and the point P2, at which the pumping speed S=1 (l/min), and the pressure P=300 (Torr), can be obtained by setting the reverse rotation speed of the first vacuum pump 13-1 at about −30%. In this case, even if the forward rotation speed of the second vacuum pump 13-2 is reduced with the operation of the first vacuum pump 13-1 suspended, it is difficult to control the system so as to attain the point P2 (S=1, and P=300). In other words, an operating point which is extremely difficult to attain by forward rotation of the second vacuum pump 13-2 can be readily obtained by reversely rotating the first vacuum pump 13-1 on the high vacuum-side.

Figure 3:
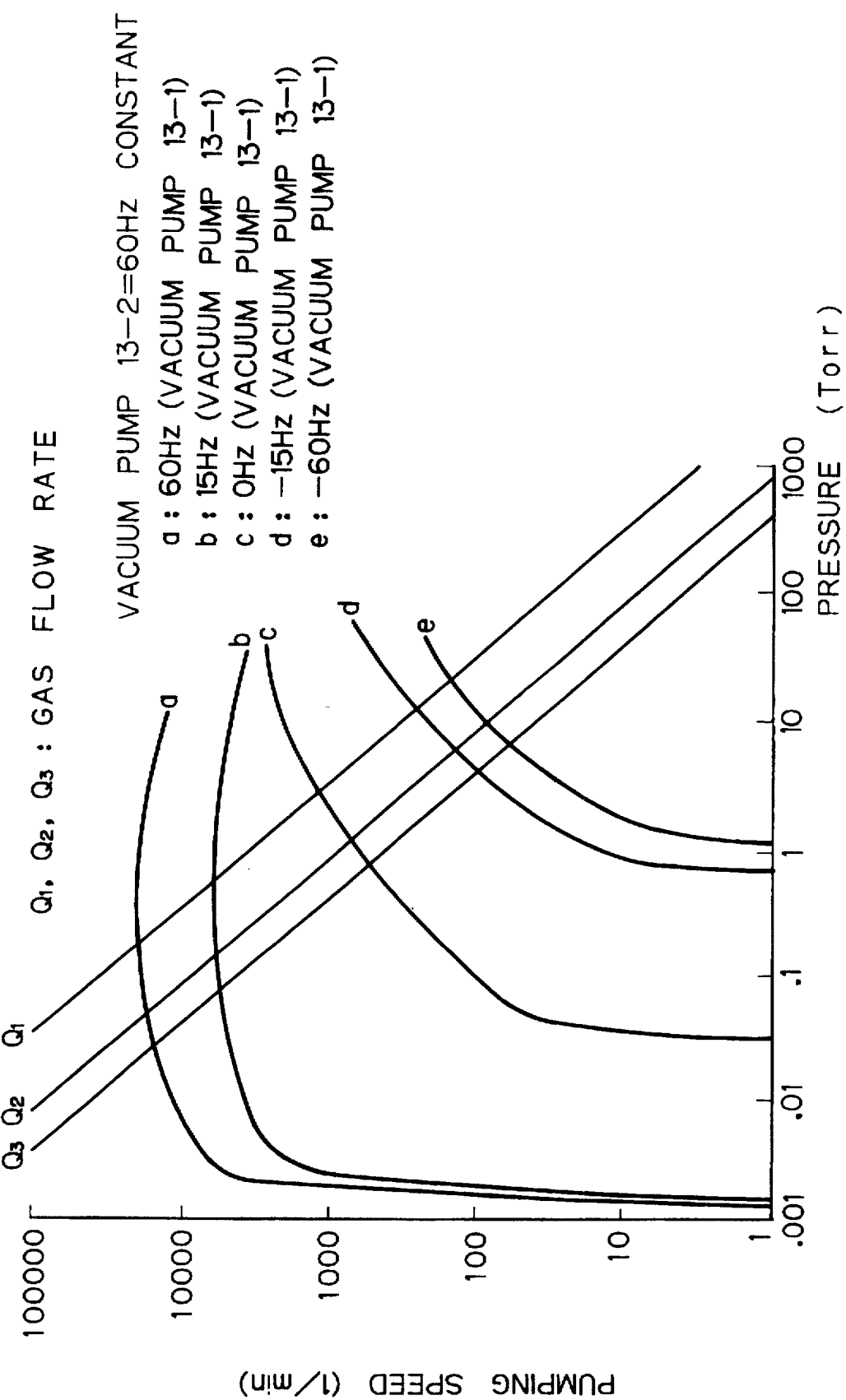
FIG. 3 is a graph showing the relationship between pumping speed and pressure when the rotational speed of a high vacuum-side vacuum pump is varied with a low vacuum-side vacuum pump being operated at a fixed speed in the vacuum system of FIG. 1.
Figure 4:
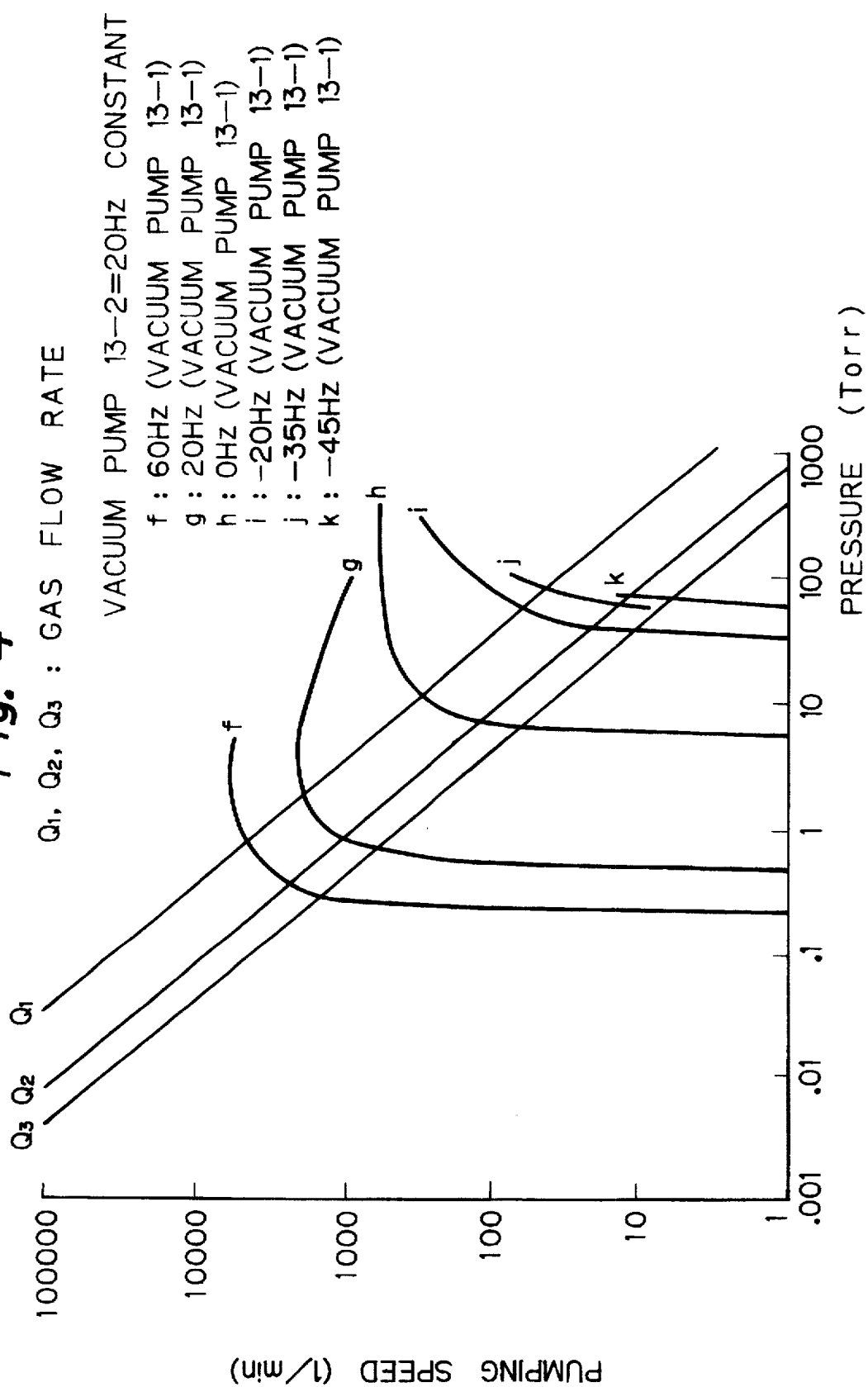
FIG. 4 is a graph showing the relationship between pumping speed and pressure when the rotational speed of a high vacuum-side vacuum pump is varied with a low vacuum-side vacuum pump being operated at an another fixed speed in the vacuum system of FIG. 1.

FIGS. 3 and 4 respectively show a graph showing the relationship between pumping speed (l/min) and pressure (Torr) when the rotational speed of the first vacuum pump 13-1 on the high vacuum-side is varied with the second vacuum pump 13-2 on the low vacuum-side being operated at a fixed speed, wherein FIG. 3 shows an operating condition in which the second vacuum pump 13-2 on the low vacuum-side is operated at 60 Hz and FIG. 4 an operating condition in which the second vacuum pump 13-2 is operated at 20 Hz.

In FIG. 3, curves a, b, c, d and e show pump characteristics when the first vacuum pump 13-1 is operated at 60 Hz, 15 Hz, 0 Hz (suspended), −15 Hz and −60 Hz, respectively. In FIG. 4, curves f, g, h, i, j and k show pump characteristics when the first vacuum pump 13-1 is operated at 60 Hz, 20 Hz, 0 Hz (suspended), −20 Hz, −35 Hz, and −45 Hz, respectively. In FIGS. 3 and 4, straight lines Q1, Q2 and Q3 respectively show a flow rate of a reaction gas supplied to the reaction apparatus 11 through and controlled by the gas supplying valve 18 (Q1>Q2>Q3).

As will be clear from FIGS. 3 and 4, when the first vacuum pump 13-1 on the high vacuum-side is operated with its rotational speed being controlled in the range of from forward rotation (+Hz) to reverse rotation (−Hz) and with the second vacuum pump 13-2 on the low vacuum-side being operated at controlled forward rotational speeds, it is possible to control a pressure in the reaction apparatus 11 over a wide range while supplying a reaction gas into the reaction apparatus 11 at a predetermined flow rate.

More specifically, in the vacuum system shown in FIG. 1, the controller 21 determines the rotational speed of the first vacuum pump 13-1 and the second vacuum pump 13-2, based on a flow rate of a reaction gas detected by the flow meter 19 and the characteristics curves of FIGS. 3 and 4 so that the pressure in the reaction apparatus 11 is kept at a targeted value and controls the inverters 15-1 and 15-2 so that the first vacuum pump 13-1 and the second vacuum pump 13-2 are operated at a determined rotational speed. The inverters 15-1 and 15-2 supply frequency outputs to the motors 14-1 and 14-2 which correspond to the determined rotational speed of the first and the second vacuum pumps. A pressure in the reaction apparatus 11 is detected by the pressure gauge 20 and is fed back to the controller 21. Therefore, a pressure in the reaction apparatus 11 is kept at the targeted value.

Figure 5:
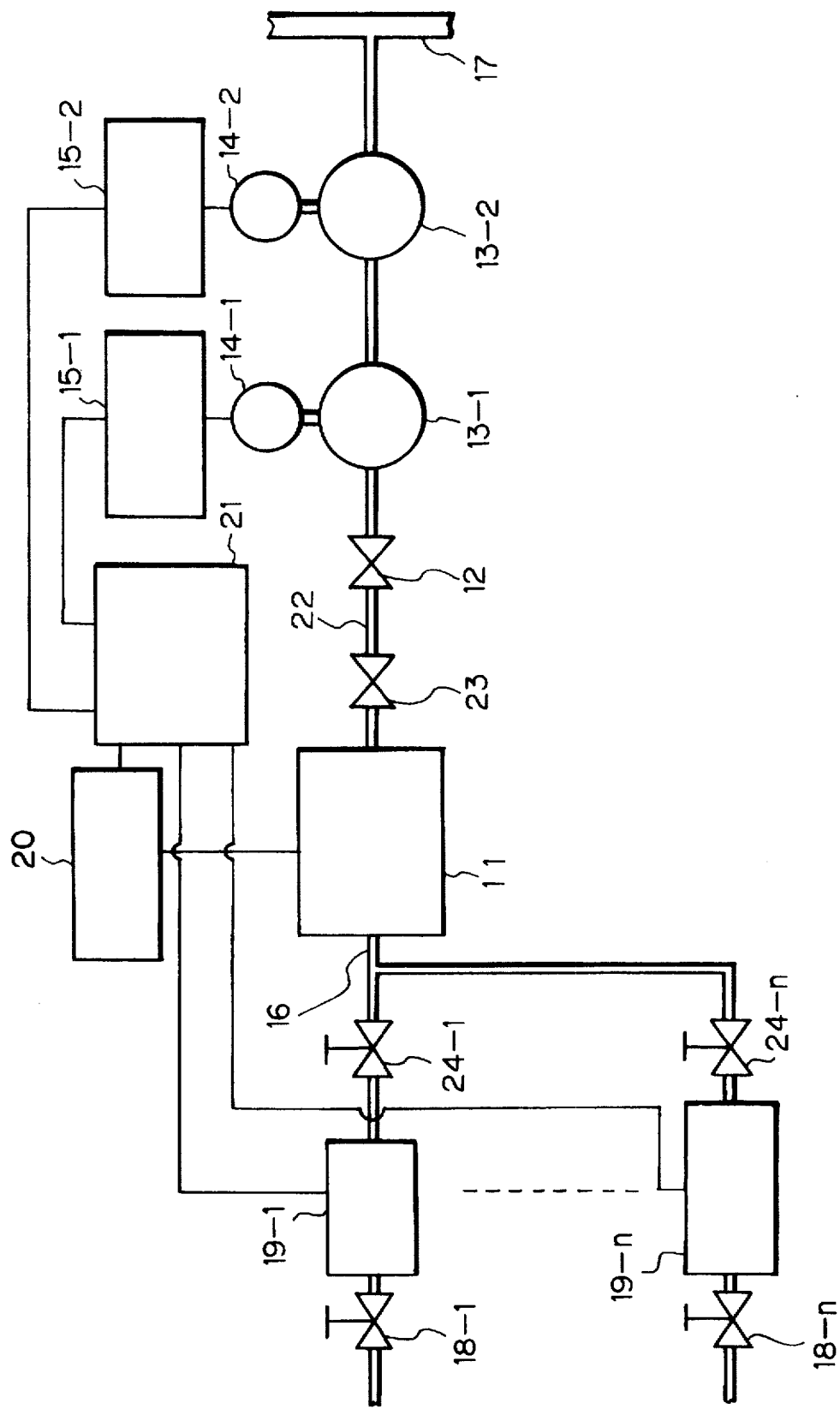
FIG. 5 is a block diagram showing the arrangement of another vacuum system in which the evacuating method of the present invention is carried out.

Although in the vacuum system shown in FIG. 1, an example in which single gas supplying system which includes the gas supplying valve 18 and the flow meter 19 is connected to the gas inlet 16 for supplying a gas into the reaction apparatus 11, the number of the gas supplying system is not limited thereto. For example, as shown in FIG. 5, number n gas supplying systems which include the gas supplying valves 18-1, 18-2 . . . , 18-n, the flow meters 19-1, 19-2, . . . , 19-n and flow regulator valves 24-1, 24-2, 24-n may be connected to the gas inlet 16 and gases including n different kinds of reaction gases may be supplied into the reaction apparatus 11. A main valve 23 may be provided between the reaction apparatus 11 and the throttle valve 12 to cut off between the reaction apparatus 11 and the vacuum pumps 13-1 and 13-2.

Figure 6:
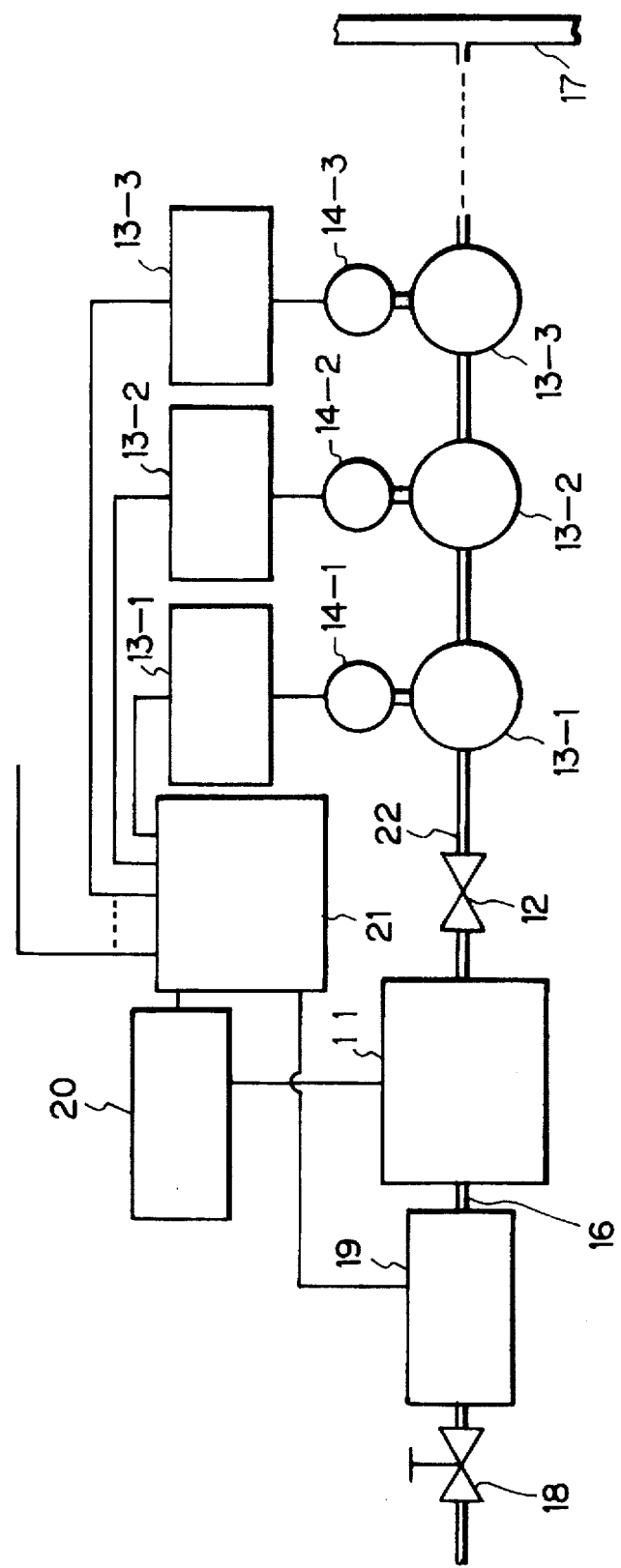
FIG. 6 is a block diagram showing the arrangement of still another vacuum system in which the evacuation method of the present invention is carried out.
Figure 7:
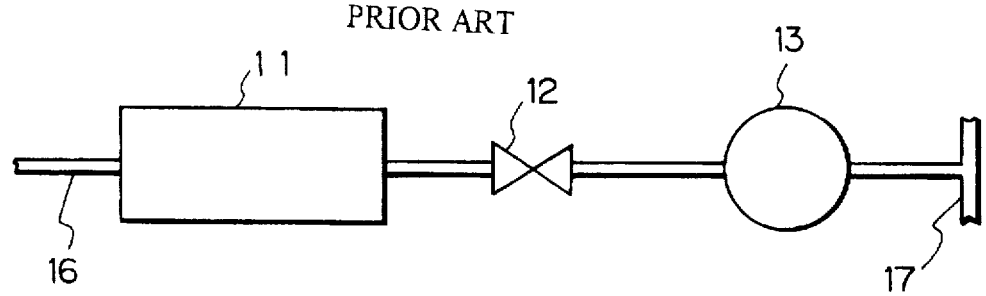
FIG. 7 shows the arrangement of a conventional evacuation system.
Figure 8:
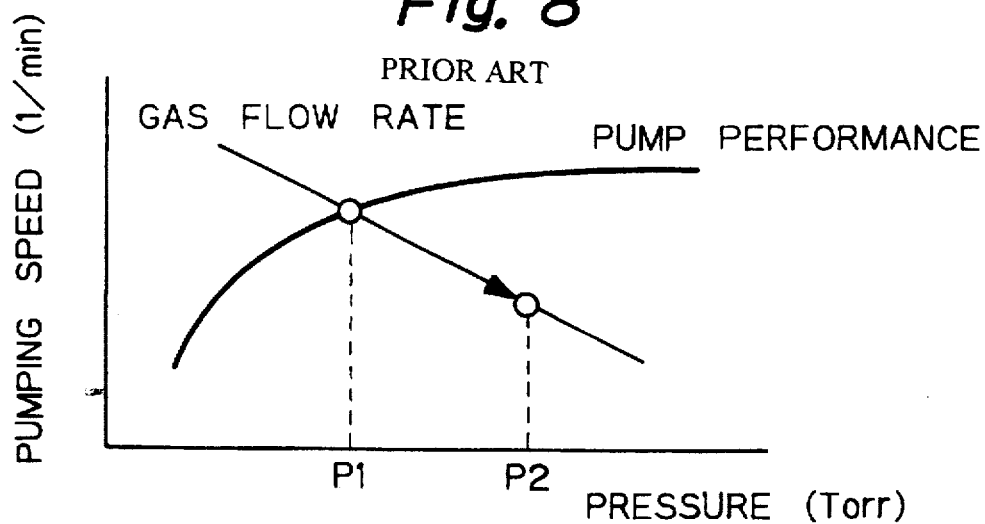
FIG. 8 is a graph for explanation of pressure control which is carried out in a vacuum system by controlling conductance (i.e., reciprocal of channel resistance) with a throttle valve.
Figure 9:
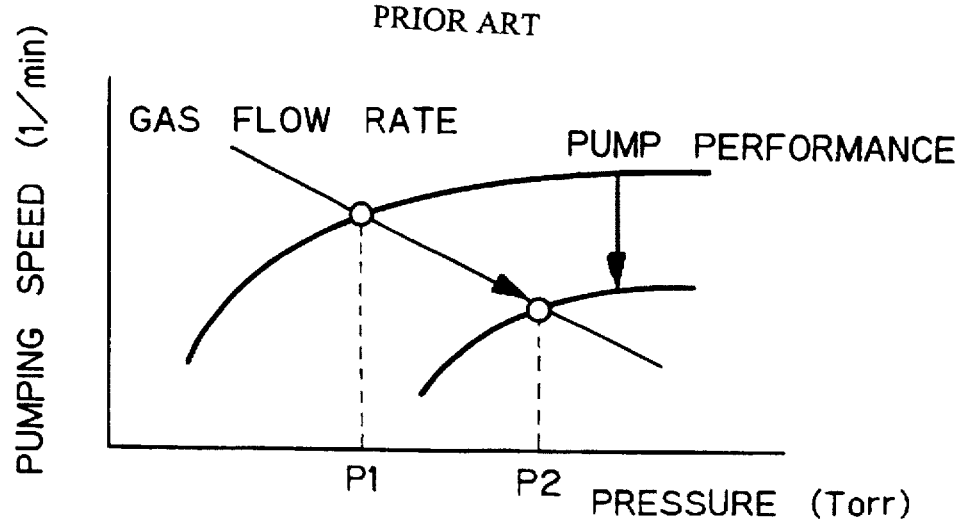
FIG. 9 is a graph for explanation of pressure control which is carried out in the vacuum system shown in FIG. 7 by controlling the pump rotation speed (pumping speed)

Although in the foregoing embodiment an example in which each of the first vacuum pump 13-1 and the second vacuum pump 13-2 comprise a single vacuum pump is shown, the invention of the present application is not limited thereto. The arrangement may be such that, as shown in FIG. 6, a plurality of vacuum pumps 13-1, 13-2, 13-3, are connected in series to a reaction apparatus 11 through a throttle valve 12, of which one or more vacuum pump or pumps may be operated as a first vacuum pump or pumps and the remaining vacuum pump or pumps may be operated as a second vacuum pump or pumps. The vacuum pumps 13-1, 13-2, 13-3, . . . , rotate at predetermined rotational speed by obtaining predetermined frequency outputs from inverters 15-1, 15-2, 15-3, . . . , respectively.

When the first vacuum pump and the second vacuum pump are constituted from a plurality of vacuum pumps as described above, it is possible to control the pressure in the vacuum system more precisely over a wider range.

Also in the foregoing embodiment, although the first vacuum pump is positioned on the high vacuum-side and the second vacuum pump is positioned on the low vacuum-side, the invention of the application is not necessary limited thereto. The arrangement may be such that the first vacuum pump is positioned on the low vacuum-side, the second vacuum pump is positioned on the high vacuum-side, the first vacuum pump is operated in the range of from reverse rotation to forward rotation, and the second vacuum pump is operated in the range of forward rotation.

As has been described above, according to the present invention, a first vacuum pump is operated in a range from reverse rotation to forward rotation, and a second vacuum pump is rotated in a range of forward rotation, thereby enabling pressure control of a vacuum system over a wide range.

In addition, it is possible to control pressure in a vacuum system while supplying a reaction gas or gases into the vacuum system.

What is claimed is:

1. An apparatus for evacuating a vacuum system which includes an evacuating portion, the apparatus comprising first and second vacuum pumps which are connected in series, in that said apparatus including a controller for operating said first vacuum pump in a range from reverse rotation to forward rotation, and for rotating said second vacuum pump unidirectionally.

2. An apparatus for evacuating a vacuum system claimed in claim 1, wherein said first vacuum pump is positioned closer to a high vacuum side of said vacuum system than said second vacuum pump.

3. An apparatus for evacuating a vacuum system claimed in claim 1 or 2, wherein said controller controls a rotational speed of said first and second vacuum pumps.

4. An apparatus for evacuating a vacuum system claimed in claim 3, further comprising a pressure gauge for detecting a pressure in said vacuum system, and said controller controls the rotational speed of said first and second vacuum pump based on a pressure in said vacuum system.

5. An apparatus for evacuating a vacuum system claimed in claim 3, wherein said controller operates said first and second vacuum pumps with the rotational speed of said second vacuum pump being kept at a constant speed.

6. An apparatus for evacuating a vacuum system claimed in claim 3, further comprising a pressure gauge for detecting a pressure in said vacuum system, and said controller controls the rotational speed of said first or second vacuum pump based on a pressure in said vacuum system.

7. An apparatus for evacuating a vacuum system claimed in claim 1, further comprising means for supplying a predetermined gas into said vacuum system.

8. An apparatus for evacuating a vacuum system claimed in claim 7, wherein said controller controls a rotational speed of said first and second vacuum pumps based on a flow rate of said gas supplied into said vacuum system.

9. An apparatus for evacuating a vacuum system claimed in claim 7, wherein said controller controls a rotational speed of said first or second vacuum pump based on a flow rate of said gas supplied into said vacuum system.

10. A method for evacuating a vacuum system which includes an evacuating portion comprising first and second vacuum pumps which are connected in series, the method comprising the steps of operating said first vacuum pump in a range from reverse rotation and forward rotation, and rotating said second vacuum pump unidirectionally.

11. A method for evacuating a vacuum system claimed in claim 1, wherein said first vacuum pump is positioned closer to a high vacuum side of said vacuum system than said second vacuum pump.

12. A method for evacuating a vacuum system claimed in claim 10 or 11, wherein the operation of said first and second vacuum pumps is effected by controlling a rotational speed of said first and second vacuum pumps.

13. A method for evacuating a vacuum system claimed in claim 12, wherein the rotational speed of said first and/or second vacuum pumps is controlled based on a pressure in said vacuum system.

14. A method for evacuating a vacuum system claimed in claim 12, wherein said first and second vacuum pumps are operated with the rotational speed of said second vacuum pump being kept at a constant speed.

15. A method for evacuating a vacuum system claimed in claim 12, wherein the rotational speed of said first or second vacuum pump is controlled based on a pressure in said vacuum system.

16. A method for evacuating a vacuum system claimed in claim 10, wherein said first and second vacuum pumps are operated while supplying a predetermined gas into said vacuum system.

17. A method for evacuating a vacuum system claimed in claim 16, wherein a rotational speed of said first and second vacuum pumps is controlled based on a flow rate of said gas supplied into said vacuum system.

18. A method for evacuating a vacuum system claimed in claim 16, wherein a rotational speed of said first or second vacuum pump is controlled based on a flow rate of said gas supplied into said vacuum system.

* * * * *